Patented Dec. 25, 1923.

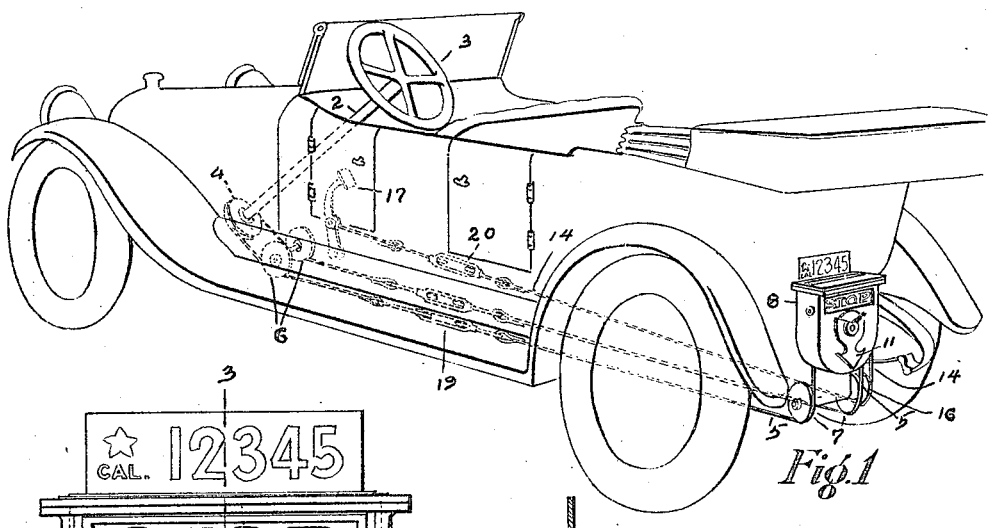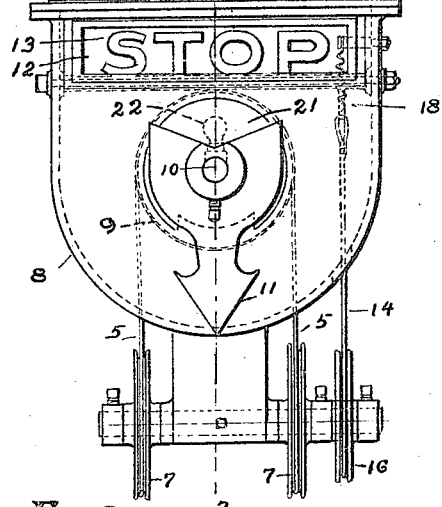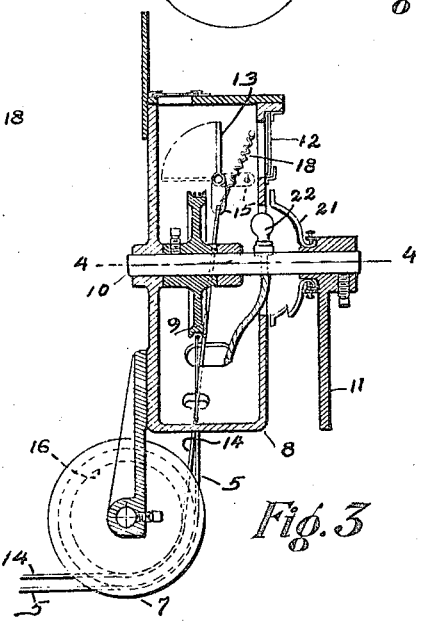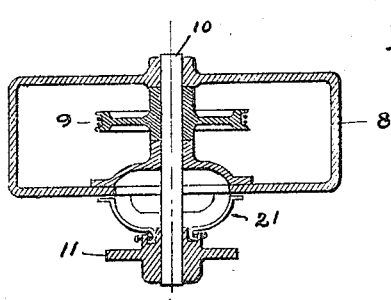

1,478,606

UNITED STATES PATENT OFFICE.

SANDOR GAZSE, OF SAN FRANCISCO, CALIFORNIA.

STOP AND DIRECTION INDICATOR.

Application filed November 17, 1921. Serial No. 515,946.

*To all whom it may concern:*

Be it known that I, SANDOR GAZSE, a citizen of the United States, and residing in the city and county of San Francisco, in the State of California, have invented certain new and useful Improvements in Stop and Direction Indicators, whereof the following is a specification.

This invention relates to direction and stop indicators for automobiles.

The object of the invention is to indicate the following machines which way an automobile is going to turn, or when it is going to stop, in order to avoid rear end collisions.

In carrying out the invention I apply preferably to the back of the automobile an indicator, which may be in the form of a pointer or arrow, which I connect by belt or otherwise with the steering gear of the machine, in such manner that when the steering gear is operated to steer the machine to one side or the other, the pointer will be automatically swung to give a corresponding indication. Contiguous to the pointer, I arrange a stop indicator which may be operated at the same time as the pointer and show that the machine is about to stop, as well as the direction in which it will turn at the time.

In the accompanying one sheet of drawing I have shown so much of an automobile as is necessary to an understanding of the invention, with mechanism embodying the invention applied thereto.

Figure 1 is a perspective outline of an automobile, with my indicators applied to the back thereof, and showing, in dotted lines, the connections thereof.

Figure 2 is an elevation showing the indicators and the casing containing the operating mechanism thereof, as the same appears when viewed from the rear of an automobile.

Figure 3 is a sectional elevation, the section being taken on the line 3, 3, of Figure 2.

Figure 4 is a cross-section on the line 4, 4, of Figure 3.

In the figures;—1 represents an automobile, 2 being the steering post and 3 the steering wheel at the top thereof. Near the lower end of the post 2, is a pulley 4, over which passes an endless belt cord or cable 5, which also passes over idlers at 6, 6, and 7, 7. From the idlers 7 the cord passes up into a casing 8, and over a pulley 9, upon an arbor 10 therein. The casing 8 is secured to the back of the automobile, in a plainly visible position, and supports the bearings for the arbor 10. Upon the end of arbor 10, outside the casing, is a pointer 11. When the steering wheel 3 is operated, the cord 5 turns pulley 9 and with it arbor 10, and so swings the pointer 11 to right or left, as the case may be, thus giving an indication to a following machine as to which way the automobile is going to turn. Above the pointer 11, in the casing 8, is an opening protected by a transparent plate 12, as shown in Figure 3 behind which, within the casing, is a vane 13, bearing the word "Stop." This vane normally lies flat, as shown in dotted lines, in Figure 3, so that the word does not appear, but it may be turned up by means of a cord 14, attached to an arm 15, and passing over an idler 16 to a treadle 17. Upon releasing the treadle 17, a spring 18 turns the vane 13 down again. Turnbuckles 19 and 20 shown in Figure 1, upon the cords 5 and 14 respectively, serve to adjust the tension thereof.

An opening in the face of the casing is covered by a cap 21, which may be transparent, or perforated, so that a tail light 22, behind it and secured to the arbor 10, may illuminate the indicators at night.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit and scope of my invention as defined in the appended claims.

What I claim and desire to secure by Letters Patent of the United States, is the following, to wit:—

Claims:

1. In an indicator for automobiles, having in combination, a casing provided with transparent front space, an oscillatory vane in said casing carrying the word "Stop" opposite said space, an arm on said vane, a treadle within reach of the driver, a cable secured at one end to said arm and its opposite end to said treadle for operating said vane and expose said word "Stop" and a turnbuckle for adjusting the tension of said cable.

2. In an indicator for automobiles, having in combination a casing adapted to be applied to the back of said automobiles, an arbor in said casing, a pointer secured to said arbor outside of said casing, means for rotating said arbor consisting of a pulley mounted on said arbor and the steering post of said automobiles, endless cable engaging said pulleys and the steering post, and means for adjusting the tension of said cable.

3. A direction indicator for automobiles, comprising, in combination an arbor, a pointer and a pulley mounted upon said arbor, steering mechanism, endless cable engaging said pulley and steering mechanism, whereby the operation of the steering mechanism automatically rotate said pulley and move said pointer to a predetermined position and a turnbuckle for adjusting the tension of said cable.

In testimony that I claim the foregoing I have hereto set my hand this 29th day of October, 1921, in the presence of two witnesses.

SANDOR GAZSE.

Witnesses:
  LOUISE BEARDEN,
  F. L. WOLFE.